United States Patent [19]
Hashimoto et al.

[11] Patent Number: 5,338,170
[45] Date of Patent: Aug. 16, 1994

[54] DEVICE FOR CHARGING FILLINGS

[75] Inventors: Shigeru Hashimoto; Kiyoshi Hasegawa; Yasunori Tashiro, all of Utsunomiya, Japan

[73] Assignee: Rheon Automatic Machinery Co., Ltd., Utsunomiya, Japan

[21] Appl. No.: 93,278

[22] Filed: Jul. 19, 1993

[30] Foreign Application Priority Data

Jul. 22, 1992 [JP] Japan .................. 4-216536

[51] Int. Cl.$^5$ .................. D21C 3/00; D21C 3/06; D21C 9/04
[52] U.S. Cl. .................. 425/92; 425/104; 425/110; 425/145; 425/320; 425/334; 118/16; 118/24; 118/25; 118/679; 118/680; 118/681; 222/630; 426/502; 426/512
[58] Field of Search .............. 425/145, 256, 320, 321, 425/92, 334, 104, 110; 118/16, 13, 24, 25, 670, 676, 679, 684, 683, 680, 681; 426/500, 501, 512; 222/367, 370, 630, 637

[56] References Cited

U.S. PATENT DOCUMENTS

| | | | |
|---|---|---|---|
| 1,029,718 | 6/1912 | Rohrbacher | 222/630 |
| 1,232,510 | 7/1917 | Derrick | 222/630 |
| 1,664,803 | 4/1928 | Agassiz | 222/630 |
| 2,915,024 | 12/1959 | Krüger et al. | 107/54 |
| 3,218,175 | 11/1965 | Siegel et al. | 222/630 |
| 3,342,145 | 9/1967 | Brunson | 118/25 |
| 3,389,838 | 6/1968 | Morra et al. | 222/630 |
| 3,583,336 | 6/1971 | Vallerga | 107/1 |
| 4,292,917 | 10/1981 | Ezaki | 118/16 |
| 4,555,226 | 11/1985 | Benier | 425/320 |
| 4,994,293 | 2/1991 | Hayashi | 426/501 |
| 5,018,439 | 5/1991 | Bordin | 425/321 |
| 5,078,585 | 1/1992 | Morikawa et al. | 425/321 |

FOREIGN PATENT DOCUMENTS

| | | | |
|---|---|---|---|
| 0093309 | 11/1983 | European Pat. Off. | 118/675 |
| 03821 | 2/1990 | European Pat. Off. | |
| 2758643 | 7/1979 | Fed. Rep. of Germany | |
| 1118660 | 7/1968 | United Kingdom | |

*Primary Examiner*—Khanh Nguyen
*Attorney, Agent, or Firm*—Limbach & Limbach

[57] ABSTRACT

A device for charging a filling material (6) with respect to pieces of dough (1) transferred on a transfer conveyor (2) comprising detectors (3) mounted on the transfer conveyor, the detectors being adapted to detect transverse shifts of the pieces of dough on the transfer conveyor and to generate signals representative of the amounts of the shifts; a filling-charging mechanism (4) disposed downstream of the detectors, the filling-charging mechanism having discharging nozzles (48) mounted movably in the transverse direction; and a control device (7) for receiving from the detectors the signals representative of the amounts of the shifts and controlling the discharging nozzles to move transversely amounts equal to the respective amounts of the shift.

7 Claims, 1 Drawing Sheet

DEVICE FOR CHARGING FILLINGS

BACKGROUND OF THE INVENTION

1. Field of the Invention

This invention relates to a device for charging a filling material with respect to every central portion of pieces of dough transferred on a transfer conveyor so that the filling in each piece of dough is deposited at the right place and does not become exposed from matching surfaces when it is rolled up downstream of the device.

2. Description of the Prior Art

In the conventional techniques no automated means are available for charging a filling material onto pieces of dough such as croissant dough and rolling up the pieces of dough. In the prior art, generally a continuous sheet of dough is cut into substantially triangular pieces of a certain size. After receiving a filling, these pieces are required to be transferred to a rolling-up device with the bottom edges of the triangles facing the rolling-up device. That is, the bottom edges extend transversely of a transfer conveyor. To do so, the triangular pieces of dough must be rotated through 90°. To rotate the pieces, an orientation-changing device provided with nails or suction cups is generally used. Such a device is disclosed in Japanese Patent (B) 61-10088 and U.S. Pat. No. 4,375,348.

In the devices of the above-mentioned patents the orientation of the pieces of dough can be successfully changed. However, the pieces of dough tend to shift transversely because the timing of catching and releasing them from the nails or suction cups by which they are engaged is not uniform, because of the thicknesses of the pieces of dough and/or other conditions. Thus, the pieces of dough shift in the direction of their widths. That is, they are not regularly placed transversely. Therefore, a downstream filling-charging device will fail to put the filling material on the central portions of the pieces of dough.

If the filling is not placed on the central portion of the piece of the dough the filling extrudes from matching surfaces of the piece of the dough when it is rolled up. The extruded filling adheres to the belt of the rolling-up device and may cause the device to fail to operate. Owing to such a drawback, at present these procedures are carried out manually.

The purpose of the present invention is to provide a device for charging the filling material with respect to the pieces of dough which have not been regularly arranged in the width direction.

SUMMARY OF THE INVENTION

The device of the present invention for charging a filling material with respect to pieces of dough transferred on a conveyor comprises a detecting device mounted on the transfer conveyor, the detecting device being adapted to detect transverse shifts of the pieces of dough and to generate signals representative of the amounts of the shifts; a filling-charging mechanism disposed downstream of the detecting device, the filling-charging mechanism having discharging nozzles mounted transversely movable; and a control device for receiving the signals representative of the amounts and directions of the shifts and controlling the discharging nozzles to transversely move them amounts equal to the amounts of the shift to be aligned with the pieces of dough.

DESCRIPTION OF THE PREFERRED EMBODIMENT

Figure 1:
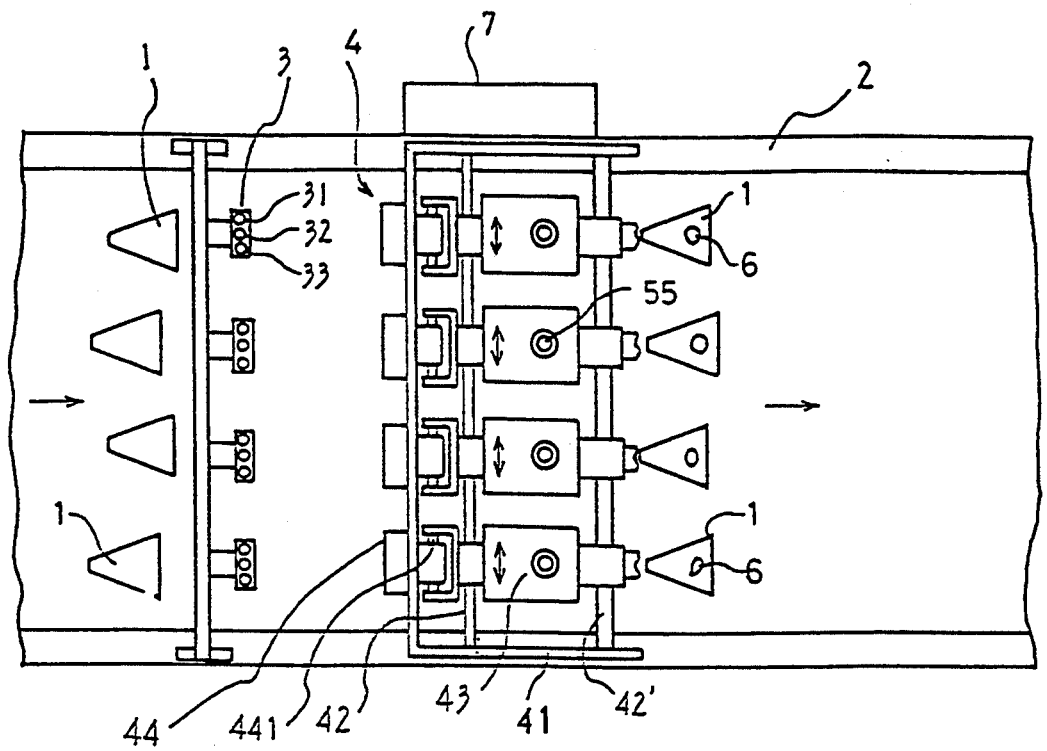
FIG. 1 is a plan view of a filling-charging device in accordance with an embodiment of the present invention, mounted on a transfer conveyor.

The present invention will now be explained through an embodiment with reference to the accompanying drawings. In FIG. 1 each piece of dough 1 is substantially in the shape of a triangle to be rolled up to form croissant dough pieces. The pieces of dough 1 are transferred on a conveyor 2.

Figure 3:
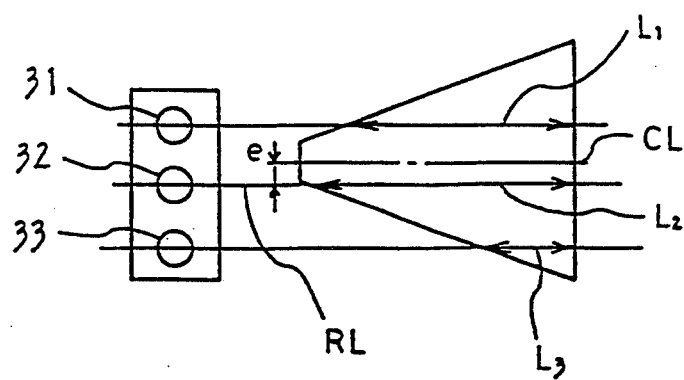
FIG. 3 is an explanatory drawing showing how to detect by a detector the transverse shifts of the pieces of dough.

A plurality of position detectors 3, which constitute a detecting device, are mounted on the conveyor 2. As shown in FIGS. 1 and 3, each of the detectors 3 includes three reflection-type photoelectric switches 31, 32, 33 arranged in line transversely of the transfer direction of the conveyor 2. The detector 3 detects the condition of the piece of dough which passes under the photoelectric switches 31, 32, 33. That is, the detector 3, or the switches 31, 32, 33, detect an amount e of the shift of a centerline CL of the piece of dough from a reference line RL which is under the switch 32. The details of the detection of the shift will be later described.

Figure 2:
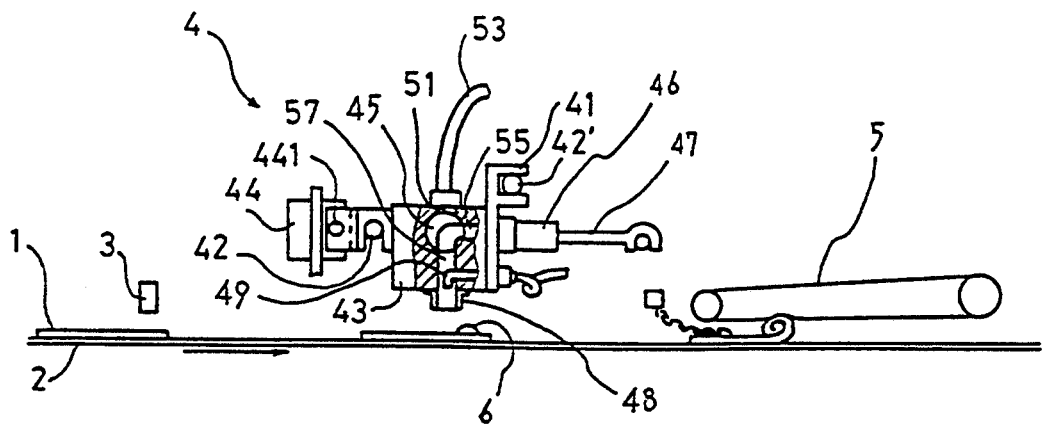
FIG. 2 is a partially sectional side view of FIG. 1.

As shown in FIGS. 1 and 2, a filling-charging mechanism 4 is disposed downstream of the detectors 3. The filling-charging mechanism 4 includes a frame 41 supported on the conveyor 2, horizontal shafts 42, 42' secured to the frame 41, a plurality of transversely movable nozzle bodies 43 mounted on the shafts 42, 42', and servomotors 44 mounted on the frame 42. An output shaft of each servomotor 44 is rotatably connected to the corresponding nozzle body 43 so that the nozzle body 43 can laterally move when the servomotor operates.

As shown in FIG. 2, the nozzle body 43 has a rotary valve 45 connected to a filling-supply port 51 which is, in turn, connected to a flexible hose 53 and a filling-supply device (not shown). A cylinder 46 is connected to the rotary valve 45 to receive a predetermined amount of the filling material into the cylinder itself through a filling-suction port 55. A discharging nozzle 48 is also connected to the rotary valve 45 through a filling-discharging port 57. An air nozzle 49 is disposed in the filling-discharging port 57. The air nozzle 49 is concentric with the suction port 55, but the diameter of the nozzle 49 is smaller than that of the suction port 55. The inner wall of the suction port 55 and the outer wall of the air nozzle 49 define a passage for filling materials. The air valve 45 is connected via piping to an air supply source.

The rotary valve 45 is supplied through an intake connected to the filling-supply port 51 with a filling material from the flexible hose 53 of the filling-supply device. A piston rod 47 of the cylinder 46 is withdrawn to take the predetermined amount of the filling material from the valve 45 into the cylinder 46. Then, after the rotary valve 45 is rotated so as to have the filling-suction port 55 communicate with the filling-discharging port 57 (as shown in FIG. 2), the piston rod 47 is advanced to extrude the filling material into the discharging nozzle 48. As the filling material has a high viscosity and the stroke of the piston is adjusted so that the filling material will not be discharged from the discharging nozzle 48, the filling material remains in the discharging nozzle 48 when the piston rod 47 is advanced. The filling material 6 is then discharged instantaneously from the nozzle 48 onto the pieces of dough 1 with the aid of an air jet from the air nozzle 49. This handling of the filling material is controlled by a control unit 7 (FIG. 1). This unit 7 will be explained later.

Detecting the shifts of the pieces of dough will now be explained in detail with reference to FIG. 3. Lengths L1, L2, and L3 of the portions of the piece of dough are the lengths of part of the imaginary lines passing through the centers of the switches 31, 32, 33 in the direction of movement of the conveyor, and at the same time passing through the piece of dough being transferred on the transfer conveyor. The central photoelectric switch 32 of the detector 3 (that is, switches 31, 32, 33) is located on the reference line RL. The other two photoelectric switches 31, 33 are positioned equidistantly from the switch 32. When the center line CL of a piece of dough shifts from the reference line RL, the lengths L1, L2, L3 of portions of the piece of dough are different due to their triangular shapes and the bases being transversely aligned. These lengths L1, L2, L3 will be known by measuring periods for the portions to pass under the switches 31, 32, 33. The amount of the shift e, including the direction of the shift to the right or left, of the piece of dough, will be calculated from the measurements L1, L2, and L3.

After the detectors 3 detect the time that it takes for each portion of the pieces of dough to pass, they send signals representative of the time to the control unit 7 (FIG. 1), such as a computer, disposed adjacent to one side of the transfer conveyor 2. After receiving the signal from the detectors 3, the control unit 7 calculates the amount of each shift of the pieces of dough and controls the servomotors 44 to cause the nozzle bodies 43 (that is, the discharging nozzles 48) to move transversely until the discharging nozzles 48 come to the calculated positions to which the center lines CL or central portions of the pieces of dough are positioned. Data for timing the discharging of the filling material from the nozzles 48, relating to the speed of the conveyor, the distance between the detectors 3 and the filling-charging mechanism, and the maximum period during which the nozzles can move transversely of the calculated positions, have been previously stored in the control unit 7.

When the pieces of dough come under the nozzles 48 which already have been moved to the calculated positions, the filling material in the discharging nozzles 48 are instantaneously discharged onto the pieces of dough as mentioned above.

The pieces of dough with the filling are conveyed downstream to a rolling-up device 5. It may be of a conventional type consisting of a chain covering and/or an overhead belt conveyor, and rolls up the pieces of dough into croissant dough pieces as shown in FIG. 2.

As described above, the shift of each piece of dough from the reference line is known by the signals from the detector 3, and every discharging nozzle 48 of the filling-charging mechanism 4 is moved a distance in a direction corresponding the amount and direction of the shift. Thus, the filling is placed on the central portion of the piece of dough.

In the embodiment shown in FIGS. 1 and 2, servomotors are used to precisely move the nozzles 48. However, air cylinders may be alternatively used to move the nozzles when such a precise movement is not required. In this case, the amount of the movement of the nozzles 48 may be preset within 10–20 mm in both directions, i.e., to the right and left, from the reference line. The detecting device detects only whether each shift of the pieces of dough is rightward or leftward. Then, the nozzles are moved the preset amount in the direction as detected.

As explained above, the air nozzle 49 is concentrically disposed in the filling-discharging port 57 and the air jet from the air nozzle 49 blows the filling material into the discharging nozzle 48 disposed under the air nozzle 48. Thus, all the filling material in the discharging nozzle 48 can be instantaneously discharged onto the piece of dough even if the material has a viscosity as high as jam. Further, the instantaneous discharge does not impede the continuous transfer of the pieces of dough on the moving conveyor, and produces more pieces of dough with a filling.

Also, as the discharging nozzle 48 of the nozzles bodies 43 work independently from one another, the nozzles can move to the central portions of the pieces of dough at the same time even if they are randomly shifted.

We claim:

1. A device for charging a filling material with respect to pieces of dough which are transferred on a transfer conveyor, comprising:
    a detecting device mounted on the transfer conveyor, the detecting device being adapted to detect transverse shifts of the pieces of dough on the transfer conveyor and generate signals representative of amounts of the shifts;
    a filling-charging mechanism disposed downstream of the detecting device, the filling-charging mechanism having discharging nozzles mounted movably in the transverse direction;
    and a control unit for receiving from the detecting device the signals representative of the amounts of the shifts and controlling the discharging nozzles to move transversely amounts equal to the respective amounts of the shifts to be aligned with the pieces of dough.

2. The device of claim 1, wherein the detecting device includes position detectors, each comprising three photoelectric switches, for detecting the shift of each piece of dough from a reference line.

3. The device of claim 1, wherein each piece of dough is in the shape of a substantially triangular sheet and is transferred downstream with a bottom edge of the triangular sheet extending transversely and forming a leading edge in the downstream direction.

4. The device of claim 3, further comprising a rolling-up device disposed downstream of the filling-charging mechanism, for rolling up the triangular flat pieces of dough with the fillings.

5. The device of claim 1, wherein the filling-charging mechanism includes a plurality of nozzle bodies having the discharging nozzles, each nozzle body comprising:
    a cylinder for receiving an amount of the filling material therein from a filling-supply source and discharging the filling material;
    a filling-discharging port connectable at one end to the cylinder to receive the filling material discharged from the cylinder and at the other end to the discharging nozzle; and an air nozzle disposed in the filling-discharging port and above the discharging nozzles in such a manner that an outer surface of the air nozzle and the inner surface of the filling-discharging port define a passage for the filling material, the air nozzle being connected to an air supply source.

6. The device of claim 5, wherein the cylinder discharges the filling material to the discharging nozzle through the passage.

7. The device of claim 5, wherein the cylinder receive the filling material from the filling-supply source through a rotary valve.

* * * * *